Figure 1:
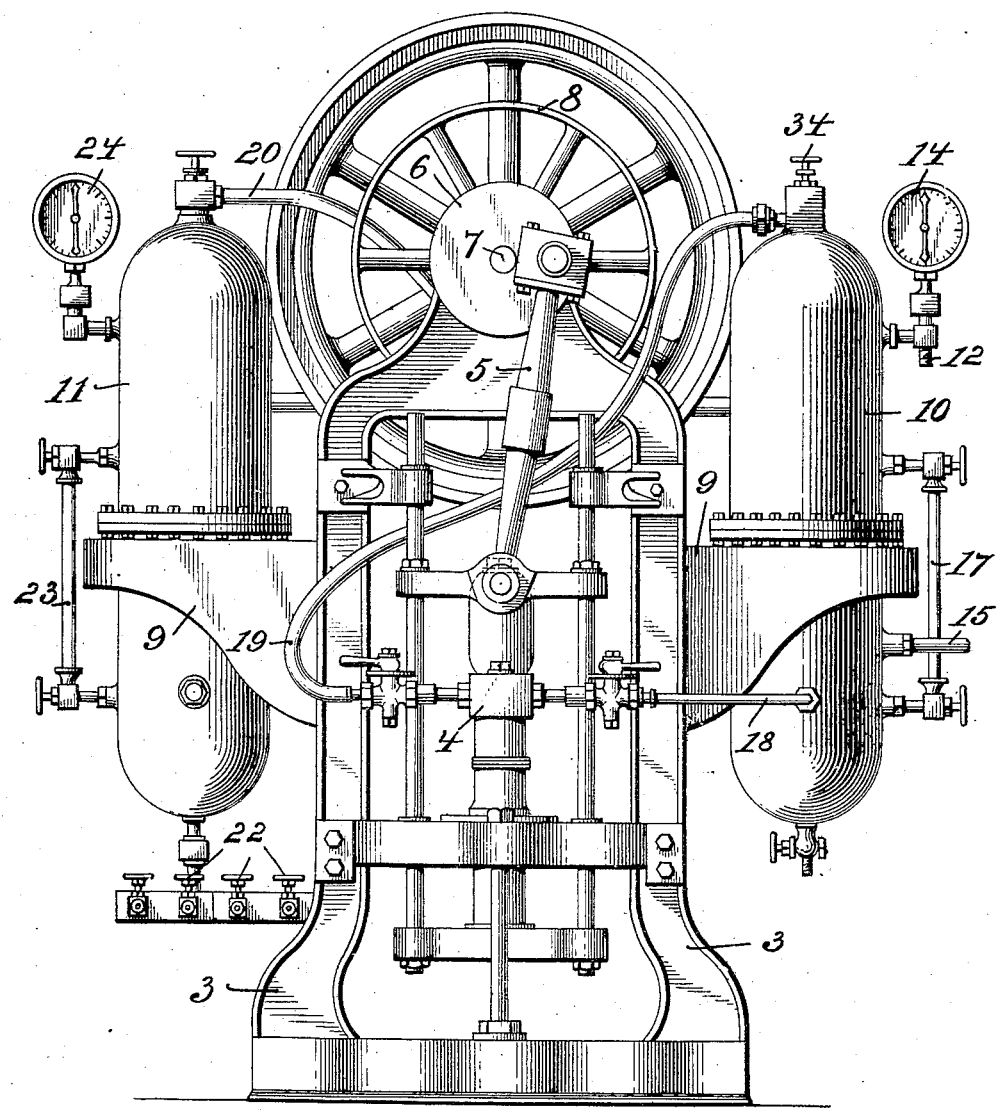

No. 854,390. PATENTED MAY 21, 1907.
S. TWITCHELL & C. O'CONNOR.
APPARATUS FOR CARBONATING LIQUIDS.
APPLICATION FILED AUG. 16, 1906.

2 SHEETS—SHEET 1.

WITNESSES:

INVENTORS

ATTORNEY.

No. 854,390. PATENTED MAY 21, 1907.
S. TWITCHELL & C. O'CONNOR.
APPARATUS FOR CARBONATING LIQUIDS.
APPLICATION FILED AUG. 16, 1906.
2 SHEETS—SHEET 2.
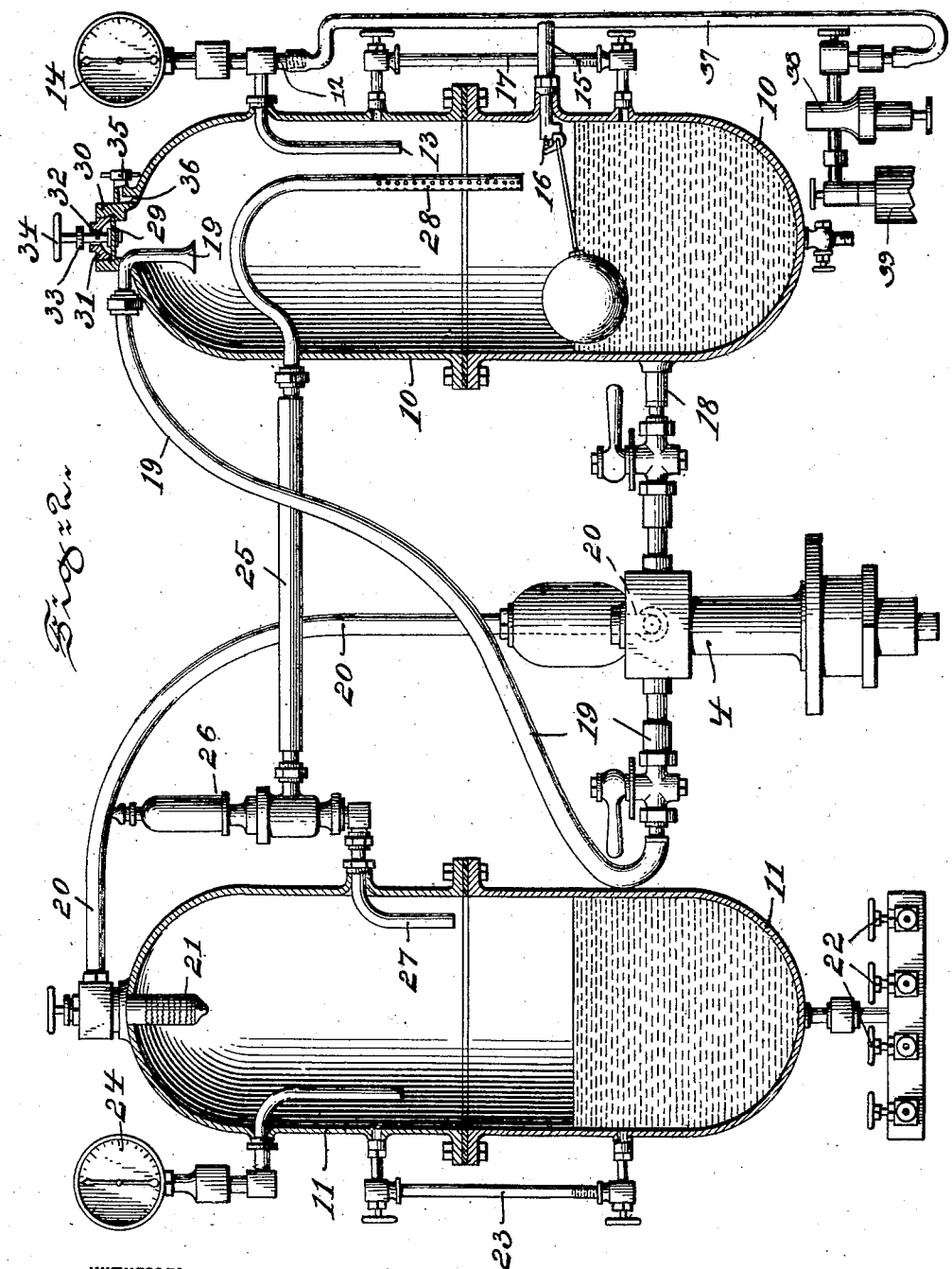
WITNESSES:
Wilhelm Vogt
Thomas M. Smith
INVENTORS
Selden Twitchell, and
BY Charles O'Connor,
J. Walter Douglas
ATTORNEY.

UNITED STATES PATENT OFFICE.

SELDEN TWITCHELL, OF BRYN MAWR, PENNSYLVANIA, AND CHARLES O'CONNOR, OF CAMDEN, NEW JERSEY, ASSIGNORS TO S. TWITCHELL CO., OF CAMDEN, NEW JERSEY, A COMPANY ORGANIZED IN NEW JERSEY.

APPARATUS FOR CARBONATING LIQUIDS.

No. 854,390.  Specification of Letters Patent.  Patented May 21, 1907.

Application filed August 16, 1906. Serial No. 330,794.

*To all whom it may concern:*

Be it known that we, SELDEN TWITCHELL, residing at Bryn Mawr, in the county of Montgomery and State of Pennsylvania, and CHARLES O'CONNOR, residing at Camden, in the county of Camden and State of New Jersey, and both citizens of the United States, have jointly invented certain new and useful Improvements in Apparatus for Carbonating Liquids, of which the following is a specification.

Our invention has relation to an apparatus for carbonating liquids; and in such connection it relates particularly to the construction and arrangement of the same for such purposes.

The nature and scope of our present invention will be more fully understood from the following description taken in connection with the accompanying drawings forming part hereof, in which Figure 1, is a view illustrating in side elevation a carbonating apparatus; and Fig. 2, is a diagrammatic view, illustrating partly in section and partly in elevation storage and receiving cylinders of the carbonating apparatus, means for connecting the storage cylinder with a gas and liquid pump and the pump with a receiving cylinder, means for connecting both cylinders with each other, means for controlling the fluid supply to the storage cylinder, and means for indicating when the gas supply thereto is exhausted, all embodying characteristic main features of our said invention.

Referring to the drawings 3, represents a standard to which is secured a mixing pump 4, of well known construction, which by means of a connecting rod 5, and disk 6, is actuated by a shaft 7, carried by the standard 3. The shaft 7, is rotated by a pulley 8, and a belt, not shown, from any suitable source of power. At each side of the pump 4, and carried by brackets 9, secured to the standard 3, are arranged a storage cylinder 10, and a receiving cylinder 11, each consisting of two sections preferably rounded at their free ends. The storage cylinder 10, by means of tubes 12, and 37 is connected with a pressure reducing valve 38, which in turn is connected with a receptacle or tube 39, containing carbonic acid gas. The tube 12, is provided within the cylinder 10, with a downwardly projecting extension 13, and outside thereof with a pressure indicator 14. Below the inlet tube 12, for gas is arranged an inlet tube 15, for water or other liquid to be carbonated which is connected with a suitable source of liquid supply, not shown. Within the storage cylinder 10, the tube 15, is provided with a float-valve 16, to regulate the supply of liquid entering the cylinder 10. A water gage 17, connected with the storage cylinder 10, serves to indicate the height or level of the liquid in the cylinder.

The cylinder 10, by directly receiving the carbonic acid gas and liquid to be carbonated forms a combined liquid and gas receptacle and thus permits of the dispensing with a separate gasometer and a so-called liquid containing box. Gas resting above the liquid in the storage cylinder 10, will thus be partially absorbed by the same. At the same time the gas by means of the reducing valve 38, introduced into the cylinder 10, at a predetermined pressure, will maintain the liquid therein under the same pressure. Under said uniformly maintained pressure of both the gas and liquid, which latter is partially charged with gas, the gas and liquid will be fed in proper proportions to the mixing pump 4, by means of the tubes 18 and 19, connecting respectively, the storage cylinder 10, at its upper and lower ends with the mixing pump 4. This pump 4, by means of a pipe 20, permits of the forcing of an admixture of gas and liquid under any pressure desired into and through a sprayer 21, arranged in the upper end of the cylinder 11, from which the admixture in the form of finely divided streams will be discharged into the receiving cylinder 11. Due to the prior partial carbonating of the liquid in the storage cylinder before being subjected to the action of the pump 4, the liquid will again be thoroughly charged with the carbonic acid gas by the pump. Moreover, by reason of the uniformity of pressure under which the gas and liquid enters the pump 4, there will be obtained a more thorough or intimate admixture of gas and liquid than hitherto was possible, due to feeding the gas and liquid to the pump 4, under varying pressures, which also causes the feeding of gas or liquid alone as the greater pressure of the one will force the other back to its receptacle or container.

From the receiving cylinder 11, the carbonated liquid by means of discharge cocks 22, is withdrawn into bottles or other suitable appliances, not shown. A liquid gage 23, connected with the receiving cylinder 11, indicates the height or level of the carbonated liquid therein, while a pressure gage 24, secured to the cylinder 11, indicates the pressure under which the liquid is held by the pump 4, in the cylinder. In order to return to the storage cylinder 10, from the receiving cylinder 11, any surplus gas or carbonated liquid, both cylinders at their upper portions are connected with each other by means of a tube 25, provided with a pressure regulator 26, of well known construction. The tube 25, at one end is provided with a downwardly projecting extension 27, arranged within the receiving receptacle 11, and at the other end with a downwardly projecting perforated tube 28, arranged within the storage cylinder 10. If, therefore, for one reason or another, the carbonated liquid is not withdrawn from the receiving cylinder 11, and by the continuous supply of the pump 4, the liquid rises therein, any danger to the apparatus due to the rise of the pressure in the cylinder will be obviated by the liquid and gas escaping, in this instance, through the pipe 25, into the storage cylinder 10. In this cylinder 10, the further supply of liquid to be carbonated is automatically cut off, by the float valve 16, while any rise of the pressure will prevent further admission of gas into the cylinder 10.

The pressure regulator 26, arranged in the connecting pipe 25, is so regulated as to normally prevent transmission of pressure from the receiving cylinder 11, to the storage cylinder 10. Thus the liquid and the gas in the storage cylinder 10, is normally held under such a low pressure by the reducing valve 38 as to permit of discharge of substantially the entire contents of the gas generated in a generator or stored in the tube 39 into the cylinder 10, as required. In this manner loss of gas which heretofore occurred by discharging the same directly into the receiving cylinder 11, is effectually overcome in that the liquid in this cylinder must naturally be held at a comparatively high pressure to permit of the discharge of the carbonated liquid from the same into bottles or other receptacles. Therefore, if the pressure in the gas generator or gas storage tube 39 became equal to the pressure in the receiving cylinder 11, the gas still remaining in the generator or tube 39, could not be fed to the cylinder and hence would be lost.

In order to indicate when the gas supply in the storage cylinder 10, is exhausted, the same is provided with a diaphragm 29, arranged in an extension 30, of the cylinder 10, and held removably in position in the said extension by means of a cap 31, as shown in Fig. 2. To the diaphragm 29, is secured a bolt 32, loosely passing through the cap 31, and provided outside thereof with preferably an extension 33, and a disk 34, forming a visual signal, but any other type of indicating device may be employed for such purposes. When the extension 33, is brought into contact with the cap by the downward movement of the diaphragm 29, due to atmospheric pressure, the visual signal is given, to stop the further actuation of the pump 4, until the cylinder 10, is again connected with a tube 39, or other source of gas supply. In addition thereto, the cylinder 10, is provided with an air vent 35, connected by a passageway 36, with the interior of the cylinder 10, to permit of discharge of air therefrom when the air is displaced by the carbonic acid gas entering the cylinder 10.

Having thus described the nature and objects of our invention, what we claim as new and desire to secure by Letters Patent is:—

1. In an apparatus of the character described, a receiving cylinder and a discharging cylinder, each containing in the lower portion carbonated liquid and in the upper portion carbonic acid gas, a pipe connecting the upper portions of said cylinders with each other to permit of the flow of gas or liquid from the discharging cylinder into the receiving cylinder and to prevent complete filling of said discharging cylinder with liquid, pressure controlling means arranged in the pipe to permit of the maintenance of the gas under a higher pressure in the discharging cylinder than in the receiving cylinder, a pump arranged intermediate of said cylinders, feed pipes arranged opposite each other in said pump and connecting the same with the lower and upper portions of said receiving cylinder, a discharge pipe connecting the pump with the upper portion of said discharging cylinder, said pump adapted when actuated to commingle the gas and liquid fed thereto separately and under an even pressure from the receiving cylinder and to force the same into the upper portion of said discharging cylinder so as to pass through the gas contained therein.

2. In an apparatus of the character described, two cylinders, each containing in the lower portion carbonated liquid and in the upper portion carbonic acid gas and forming respectively a receiving cylinder and a discharging cylinder, a pipe connecting the upper portions of the cylinders with each other and terminating a certain distance above the level of the liquid therein, pressure controlling means arranged in the pipe and adapted to permit of the flow of gas or liquid from the discharging cylinder into the receiving cylinder to reduce in the one instance the pressure of gas and in the other prevent complete filling with liquid of said discharging cylinder, a liquid supply pipe adapted to permit of the entrance of liquid into the lower portion of said receiving cylinder, a valve connected with said supply pipe for automatically controlling the level of the liquid in said receiving cylinder, a gas supply pipe for conducting gas into the upper portion of said receiving cylinder, means arranged in said gas supply pipe for reducing the pressure of the gas entering said receiving cylinder, a pump arranged intermediate of said cylinders, feed pipes arranged opposite each other in said pump and connecting the same with the lower and upper portions of said receiving cylinder, a discharge pipe connecting the pump with the upper portion of said discharging cylinder, said pump adapted when actuated to commingle the gas and liquid fed thereto separately and under an even pressure from the receiving cylinder and to force the same into the upper portion of said discharging cylinder so as to pass through the gas contained therein.

In witness whereof, we have hereunto set our signatures, in the presence of two subscribing witnesses.

SELDEN TWITCHELL.
CHAS. O'CONNOR.

Witnesses:
GEO. W. REED,
J. WALTER DOUGLASS.